(12) United States Patent
Ren et al.

(10) Patent No.: US 9,382,156 B2
(45) Date of Patent: Jul. 5, 2016

(54) LIGHTWEIGHT EXTRUDED CEMENTITIOUS MATERIAL AND METHOD OF MAKING THE SAME

(71) Applicant: JAMES HARDIE TECHNOLOGY LIMITED, Dublin (IE)

(72) Inventors: Shan Ren, Moreno Valley, CA (US); Jongmin Keum, Rancho Cucamonga, CA (US); Bhavin Mehta, Aurora, IL (US); Eoin Battles, Rancho Cucamonga, CA (US)

(73) Assignee: James Hardie Technology Limited, Dublin (IE)

( * ) Notice: Subject to any disclaimer, the term of this patent is extended or adjusted under 35 U.S.C. 154(b) by 0 days.

(21) Appl. No.: 14/361,666

(22) PCT Filed: Nov. 30, 2012

(86) PCT No.: PCT/US2012/067440
§ 371 (c)(1),
(2) Date: May 29, 2014

(87) PCT Pub. No.: WO2013/082524
PCT Pub. Date: Jun. 6, 2013

(65) Prior Publication Data
US 2014/0356606 A1    Dec. 4, 2014

Related U.S. Application Data

(60) Provisional application No. 61/565,453, filed on Nov. 30, 2011.

(51) Int. Cl.
*B32B 13/02* (2006.01)
*C04B 28/04* (2006.01)
(Continued)

(52) U.S. Cl.
CPC ............... *C04B 16/0633* (2013.01); *B28B 1/50* (2013.01); *B28B 1/52* (2013.01); *B28B 3/20* (2013.01);
(Continued)

(58) Field of Classification Search
None
See application file for complete search history.

(56) References Cited

U.S. PATENT DOCUMENTS

| 5,366,549 A | 11/1994 | Imaizumi et al. |
| 5,631,097 A * | 5/1997 | Andersen ................ B28B 1/00 428/220 |

(Continued)

FOREIGN PATENT DOCUMENTS

| CN | 101 239 806 | 8/2008 |
| DE | 199 04 707 | 11/2000 |

(Continued)

OTHER PUBLICATIONS

International Search Report and Written Opinion for corresponding PCT Application No. PCT/US2012/067440, filed Nov. 30, 2012, dated Feb. 13, 2013, 14 pages.

(Continued)

*Primary Examiner* — David Sample
*Assistant Examiner* — Nicole T Gugliotta
(74) *Attorney, Agent, or Firm* — Knobbe, Martens, Olson & Bear LLP

(57) ABSTRACT

Embodiments of the present disclosure are directed to a low density monolithic fiber cement article that incorporates controlled air entrainment evenly distributed throughout the article to improve various physical properties of the article. In some implementations, air entrainment agents are used to create voids in the article, thereby lowering the density and weight of the boards while maintaining adequate strength. In some implementations, the air entrainment agents can be added in solution to create a foam, or can be used to generate a pre-foam, which can be added to a cementitious paste. The cementitious paste incorporating the air entrainment agent can proceed through an extrusion process, experiencing high pressures, where the voids remain in the final monolithic fiber cement board.

12 Claims, 21 Drawing Sheets

(51) Int. Cl.
*C04B 16/06* (2006.01)
*B28B 1/50* (2006.01)
*B28B 1/52* (2006.01)
*B28B 3/20* (2006.01)
*C04B 28/02* (2006.01)
*B28B 23/02* (2006.01)
*C04B 7/00* (2006.01)
*C04B 16/02* (2006.01)
*C04B 111/00* (2006.01)
*C04B 111/40* (2006.01)

(52) U.S. Cl.
CPC . *B28B 23/02* (2013.01); *C04B 7/00* (2013.01); *C04B 16/02* (2013.01); *C04B 28/02* (2013.01); *C04B 2111/00129* (2013.01); *C04B 2111/40* (2013.01); *Y02W 30/97* (2015.05)

(56) References Cited

U.S. PATENT DOCUMENTS

| | | |
|---|---|---|
| 6,572,697 B2 | 6/2003 | Gleeson et al. |
| 6,676,744 B2 | 1/2004 | Merkley et al. |
| 2005/0241543 A1 | 11/2005 | Hagen et al. |
| 2006/0006132 A1* | 1/2006 | Lauer ............... B65D 39/0005 215/355 |
| 2007/0110989 A1* | 5/2007 | Shin ..................... C04B 33/04 428/312.2 |
| 2009/0075073 A1 | 3/2009 | Biddle et al. |
| 2010/0136269 A1 | 6/2010 | Andersen et al. |
| 2010/0215934 A1* | 8/2010 | Fabian Mariezkurrena et al. ........................ 428/220 |
| 2010/0251632 A1 | 10/2010 | Chen et al. |
| 2010/0310846 A1 | 12/2010 | Berke et al. |

FOREIGN PATENT DOCUMENTS

| | | |
|---|---|---|
| JP | 01 119575 | 5/1989 |
| WO | WO 2004/031093 | 4/2004 |
| WO | WO 2011/044605 | 4/2011 |
| WO | WO 2011/086333 | 7/2011 |
| WO | WO 2013/082524 | 6/2013 |

OTHER PUBLICATIONS

Extended European search report for EP Application No. 12853221.5 mailed on Oct. 15, 2013 in 13 pages.

* cited by examiner

LIGHTWEIGHT EXTRUDED CEMENTITIOUS MATERIAL AND METHOD OF MAKING THE SAME

BACKGROUND

1. Field

The present disclosure relates generally to cementitious materials, and more particularly, relates to a low density extruded monolithic cementitious shaped article and methods of manufacturing the same.

2. Description of the Related Art

Fiber cement materials are commonly used in building construction. Fiber cement boards, for example, can be used both in the interior of a house, such as for tile backing, and on the exterior of the house, such as for siding. Efforts have been made to develop various low cost methods to reduce the density and weight of fiber cement while maintaining desirable performance characteristics of the material. For example, low density fillers, such as ceramic microspheres, have been incorporated in fiber cement products to reduce the weight and material cost. The fillers are generally selected to reduce the density of the fiber cement without substantially impairing the performance characteristics of the final product in both installation and lifetime durability and performance.

It is, however, particularly challenging to incorporate low density fillers into fiber cement building products formed by extrusion. Low density fillers have difficulty withstanding the physical and mechanical forces imparted by the extrusion process, which is commonly used for manufacturing cellulose fibers reinforced cement sheets and panels. Like air voids, the fillers can burst or be crushed under the high pressure and temperature conditions encountered during the extrusion process. As such, it is very difficult to control the distribution or amount of low density fillers in monolithic, extruded fiber cement materials.

SUMMARY

Disclosed herein are improved low density cementitious articles and methods for manufacturing the same, particularly for manufacturing extruded low density cementitious articles for building construction applications.

In one embodiment, the low density cementitious article comprises a monolithic cementitious matrix comprising a plurality of closed cell voids that are distributed throughout the matrix in a manner such that the density of the cementitious matrix remains uniform throughout. The size and shape of the closed cell voids are defined by the cementitious matrix as the cell walls are formed by the cementitious matrix. In some implementations, a portion of the cell walls is also formed by a resin. The density of the cementitious matrix can be less than 1 $g/cm^3$, preferably less than 0.97 $g/cm^3$, preferably between 0.92 $g/cm^3$ and 0.97 $g/cm^3$. In some implementations, the low density cementitious article further comprises open cell voids wherein the open cell voids are less than 10% of the combined open and closed cell voids. The closed cell voids can range in size from 0.02 to 0.15 millimeter (mm) in diameter. The cementitious matrix can be configured with a generally rectangular configuration with a thickness of less than 20 mm. In some implementations, the low density cementitious article further comprises reinforcing fibers having a length of between 0.05 mm and 5 mm, or 10 mm to 12 mm, and a diameter of between 5 μm and 150 μm. In some implementations, the low density cementitious article further comprises a blend of cellulose fibers and polypropylene fibers. In some implementations, the composition of the cementitious matrix can comprise 35-70% cement; 0-15% reinforcing fibers, preferably cellulose fibers or polypropylene fibers; 0-0.1% air entrainment agent; 10-70% siliceous aggregates; and 0.6-1% viscosity enhancement agents. The low density cementitious article preferably has a modulus of rupture of between 5 and 8 MPa and toughness of between 2 and 5 $KJ/m^3$. In some implementations, the low density cementitious article can experience a midsection thickness change of approximately 5-8% after 300 cycles of a durability test.

In another embodiment, a method of manufacturing a fiber cement shaped article is provided. The method comprises forming a cementitious paste comprising cement, water, and fibers; followed by combining the cementitious paste with reinforcing fibers; and then incorporating one or more air entrainment agents into the cementitious paste, wherein the one or more air entrainment agents impart air bubbles to the cementitious paste. The method further comprises extruding the cementitious paste into a shaped article by applying pressure to the cementitious paste. The pressure can be greater than 400 pounds per square inch (psi). The shaped article preferably has a density of less than 1 $g/cm^3$, or less than 0.95 $g/cm^3$, or less than 0.92 $g/cm^3$, and comprises air bubbles that are evenly distributed throughout the article. In some implementations, the one or more air entrainment agents are added directly into the cementitious paste. In some implementations, the one or more air entrainment agents are activated to generate a foam before being incorporated into the cementitious paste.

DETAILED DESCRIPTION

Embodiments of the present disclosure provide low density cementitious shaped articles, such as building construction materials, having a controlled amount of air entrainment distributed throughout the article to improve the material properties. Embodiments of the present disclosure also provide methods of manufacturing such low density cementitious shaped articles, particularly methods of incorporating a controlled amount of air entrainment in an extruded fiber cement material.

The term "board" as used herein is a broad term and shall have its ordinary meaning and shall include, but not be limited to, a generally long, wide, and thin piece which may be formed to a predetermined shape, and any additional forming required to secure the formed board in its intended location. The board may have a substantially rectangular surface, although other shapes and cross-sections are contemplated as well.

The term "matrix" as used herein is a broad term and shall have its ordinary meaning and shall include, but not be limited to, the internal structure of a cementitious board, where there can be a mixture of cement and fibers.

The term "foam" as used herein is a broad term and shall have its ordinary meaning and shall include, but not be limited to, a substance that is formed by trapping pockets of gas in a liquid or a solid.

The term "voids" as used herein is a broad term and shall have its ordinary meaning and shall include, but not be limited to, gas bubbles or air bubbles.

The terms "approximately", "about", and "substantially" as used herein represent an amount close to the stated amount that still performs a desired function or achieves a desired result. For example, the terms "approximately", "about", and "substantially" may refer to an amount that is within less than 10% of, within less than 5% of, within less than 1% of, within less than 0.1% of, and within less than 0.01% of the stated amount.

The preferred embodiments of the present disclosure provide a low density extruded fiber cement material incorporating a controlled distribution of air entrainment in the material. As discussed in greater detail below, through a combination of preselected composition including air entrainment agents (AEA) and processing steps, a final fiber cement material may be achieved that gives rise to selected mechanical properties of interest, including at least reduced density and weight, while maintaining adequate strength and toughness.

Monolithic Fiber Cement Board

Figure 1:
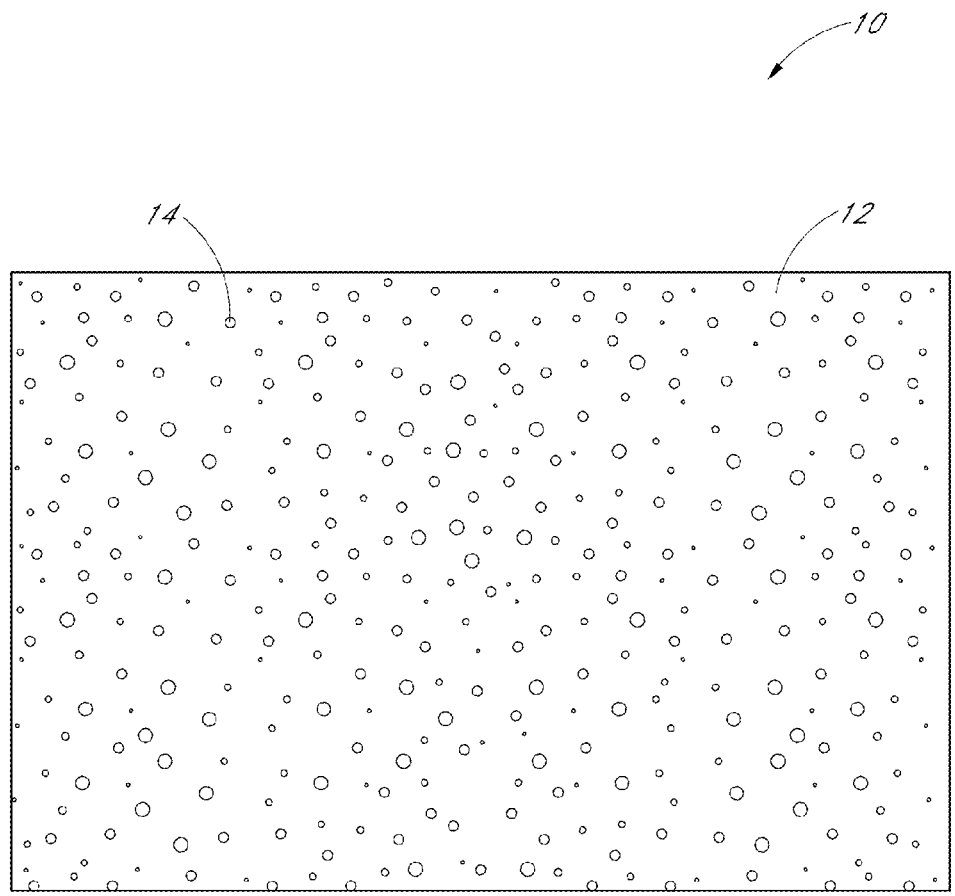
FIG. 1 illustrates an embodiment of a low density monolithic cementitious shaped article.

FIG. 1 illustrates a low density monolithic fiber cement board 10 according to an embodiment of the present disclosure. The fiber cement board 10 comprises a monolithic cementitious matrix 12 having air entrainment 14 uniformly distributed throughout the material at a predetermined density. In one implementation, the air entrainment 14 comprises voids having walls defined by the matrix 12. In some embodiments, there can be between 25 and 2000 voids per $cm^3$, or between 150 and 550 voids per $cm^3$, or between 850-1500 voids per $cm^3$. Preferably, the air entrainment 14 is evenly distributed throughout the board such that the fiber cement board has a uniform density of between about 0.5 and 1 $g/cm^3$, more preferably between about 0.92 and 0.97 $g/cm^3$. The fiber cement board 10 can have a rectangular, elongate configuration and a thickness of approximately 1 cm, 2 cm, 3 cm, 4 cm 5 cm, 6 cm, 6 cm, 8 cm, 9 cm, or 10 cm, although other thicknesses can be used.

Surprisingly, the monolithic fiber cement board 10 can have the reduced density of between about 0.92 and 0.97 $g/cm^3$ through the additions of air entrainment, while still maintaining high strength and toughness. In one implementation, the monolithic fiber cement board 10 can have a modulus of rupture of approximately 5-8 MPa, which is approximately equal to a board having a higher density. In addition, the monolithic fiber cement board 10 can experience approximately 2-5 $KJ/m^3$ of energy before breaking, which is approximately equal to, if not higher, than a board having a higher density. Therefore, unexpectedly, the overall density of a monolithic fiber cement board can be reduced, while still maintaining high strength and toughness.

In various embodiments, the monolithic fiber cement board 10 can be manufactured from a cementitious paste. A cementitious paste can comprise cement, water, and fibers, and other additives. The paste can then be combined with reinforcing fibers, such as cellulose and/or polypropylene (PP) fibers. Foam can be added to the paste through the use of an air entrainment agent to form air bubbles. The paste can then be extruded to form a board, and in some embodiments, the density of the board can be lowered.

In certain preferred embodiments, to lower the density of a fiber cement board while also maintaining structural integrity, voids of a specified size, shape, and distribution can be created during the manufacturing process. Preferably, the voids are approximately 0.02 to 0.15 mm in diameter, and evenly distributed throughout the board. A controlled amount of air entrainment added to the fiber cement during manufacturing, either as a foam or a concentration of air entrainment agent (AEA), can create voids in the boards. Further, the voids can increase the durability of the monolithic fiber cement material. The use of air entrainment can also increase the workability of the fiber cementitious mixture when manufacturing cementitious products.

The AEA added during the manufacturing process can entrain air within the matrix of the fiber cement board. This can be done by creating a foam in the cementitious paste, either during the mixing process along with the paste or the foam can be injected into the paste. The foam contains trapped air or other gas, and when added into the cementitious paste, the air pockets, or voids, remain in the cementitious paste. These air bubbles create the voids in the product, which lowers the overall density and weight of the board. In some embodiments, AEA and a surfactant are mixed together to form the air bubbles. Further description describing creation of voids in the cement boards is discussed below.

In some embodiments, the AEAs that can be used include wood resins, synthetic detergents, petroleum acid salts, and fatty acids. While these agents can be manufactured to be able to survive in high pH and high pressure environments experienced during the processing of cementitious products, it is equally important that they be able to not retard cement hydration or react too quickly.

To form the voids in the cementitious product, one or more foaming agents or air entrapping agent or blowing agents and/or bubble stabilizers can be mixed together. In some embodiments, a foaming agent or blowing agent can comprise a compound or chemical that can be used to help introduce gas pockets into the cementitious product. In some embodiments, a gas or a material that produces a gas, such as calcium carbonate hydrate, sodium bicarbonate, aluminum powder, can be used. Such materials are generally activated by heat or moisture and release gas such as carbon dioxide or hydrogen into the matrix thus introducing and forming one or more gas pockets or voids described previously. In some embodiments, voids may be further incorporated into the article by mechanical air entrainment, such as through rigorous mixing in the presence of air, or a gas, with or without an air entraining agent.

The voids are preferably closed cell voids that do not form continuous air channels with adjacent voids. In some embodiments, at least 50%, 60%, 70%, 80%, 90%, or over 90% of the air voids in the article are closed cell voids. The shape and volume of the voids are preferably determined by the amount of air entrained in the fiber cement article. While air entraining techniques have been used to aerate concrete, it is very difficult to form uniformly distributed predominantly closed cell air voids in fiber cement panels or sheets using conventional concrete aeration techniques. The technique cannot be successfully and consistently applied to aeration of fiber reinforced cementitious sheets or panels for which predictable air void content and distribution are desired. In fact, numerous studies have documented the difficulties in predicting air void content of aerated uncured concrete when subject to forces or pressure. High pressure imparted on air pockets, bursting of voids by vacuum, and rupture of voids by impact forces are some of the mechanisms for air void losses in pumping aerated concrete. Thus, to the best of the inventors' knowledge, the aeration technique has not been successfully applied to producing low density fiber cement panels or sheets because of the inconsistencies in the number, distribution, and size of air voids formed by conventional air entrainment techniques.

Extrusion of Monolithic Fiber Cement Board

Figure 2:
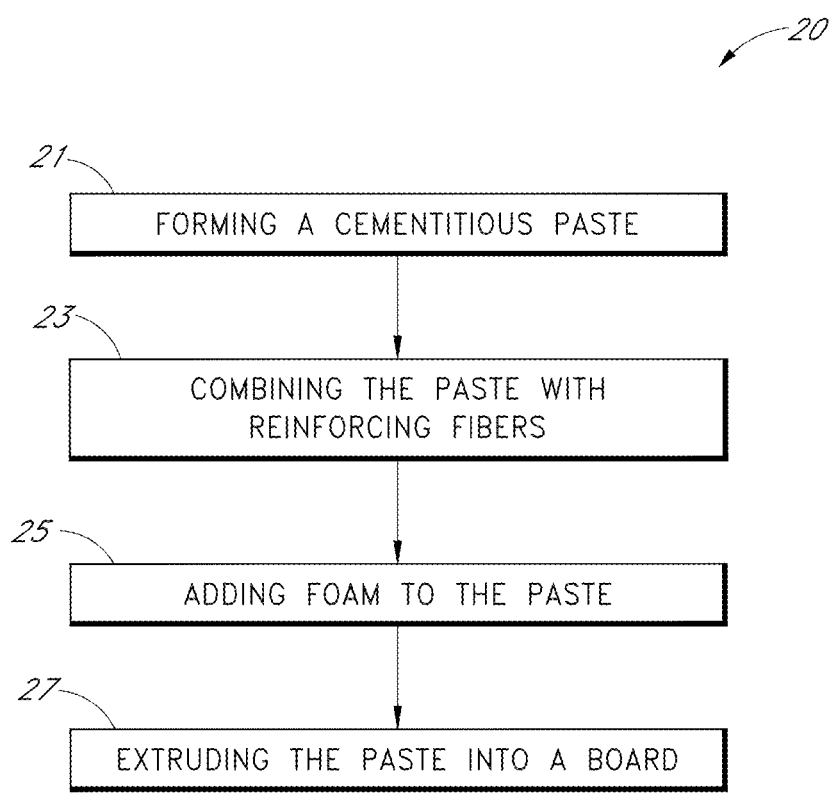
FIG. 2 illustrates an embodiment of a process for forming a low density monolithic cementitious shaped article.

In some embodiments, an extrusion process, single or double screw, can be used to manufacture the low density monolithic fiber cement board 10. FIG. 2 illustrates an embodiment of the extrusion process 20. In some embodiments, a cementitious paste is first formed in step 21. The cementitious paste can include cement, water, and other additives. The cementitious paste can then be combined with reinforcing fibers in step 23. Foam can be added to the paste in step 25, as described above, through the use of an air entrainment agent to form air bubbles. The paste can then be extruded to form a board in step 27. The extrusion consumes and uses all material that is inputted into the apparatus; no waste is generated in the green paste forming process. The extrusion process used can be an extrusion process commonly used in the art, where, for example, a cementitious paste can be formed from cement, pulp, and other additives and extruded to form boards. By this process, it presents various complexities on what air entrainment agent (AEA) to use and more importantly, how to get the AEA properly into the system during the manufacturing of the cementitious products. The amount of pressure that is built up in the extrusion barrel and during extrusion, such as a pressure of greater than about 400 psi, over the time it takes the paste to move through it (1-2 minutes) can cause challenges to keep the voids generated by the AEA intact. Therefore, specifically controlled AEA allows for the retainment of voids in the post-extruded fiber cement board.

Accordingly, as explained above, there is no information regarding that reducing the density of monolithic fiber cement boards manufactured with extrusion while maintaining mechanical properties would be technically feasible. Given the pressures, forces and temperatures encountered by the material processed through the extrusion process, all previous low cost method of reducing the density of cementitious boards have been based on the addition of a low density additive, such as hollow ceramic or glass microspheres.

In certain preferred embodiments, there are generally two processes to incorporate the air entrainment agent (AEA) into the extruder for the manufacturing of monolithic fiber cement boards, each method providing the benefit of the lower density properties. AEA can be added into a solution where the voids are generated inside of the machine, or pre-generated foam can be inserted into the extruder to create the voids.

Solution Method

In some embodiments, foam can be generated inside of the extrusion barrel. A foaming agent solution at a certain concentration can be pumped into one of the barrels of an extruder that contains the cementitious paste. The mixing process in the extruder generates mechanical force, creating the foam which creates voids in the paste. These voids remain in the paste throughout the manufacturing process. As the paste comes out of the die, the voids are trapped in the matrix of the cement board, creating a lower density board.

Pre-Generated Foam

In some embodiments, a high pressure system can be used to generate pre-generated foam and to insert the pre-generated foam into the extrusion barrel. This differs from the solution method, as the foam is created prior to mixing with the cementitious paste. By configuring the proper pressure in conjunction with the paste volume, the proper size voids and distribution is possible to help reduce density while maintaining the appropriate properties.

The high pressure system can be used in conjunction with the extruders. Extruders have certain screw configurations that function to either mix, knead, or move the paste through the barrel depending on the material that is present to be manufactured. Various sizes of extruders are present and also should be considered when deciding in what location to insert the pre-generated foam additive.

In order to deliver and generate pre-foam with compressed air and water or AEA, the nozzle configuration can preferably have up to about 100 psi compressed air, for example about 80 psi, about 85 psi, about 90 psi, about 95 psi, and up to about 100 psi pump for AEA or water, for example about 80 psi, about 85 psi, about 90 psi, about 95 psi.

Figure 3:
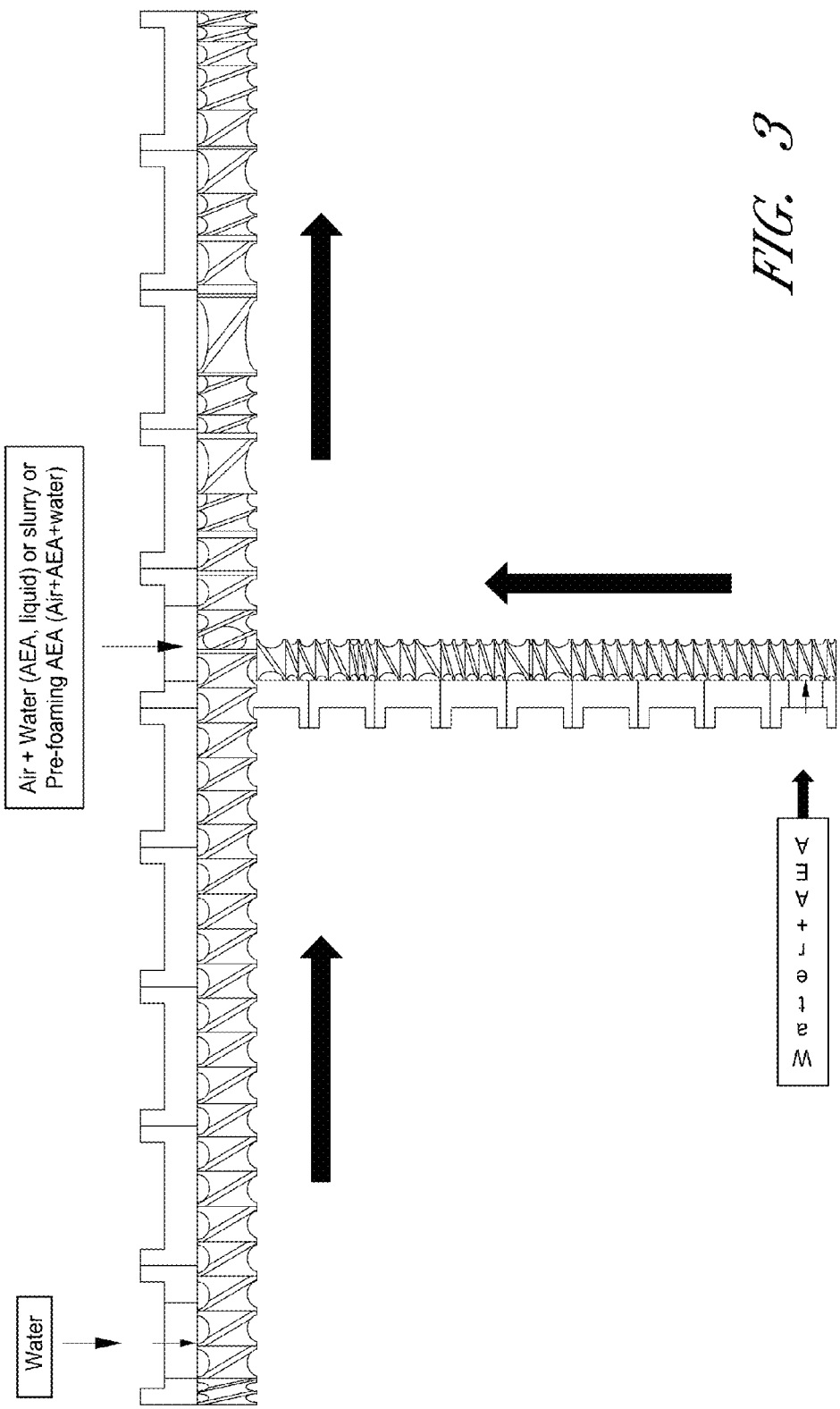
FIG. 3 illustrates various embodiments of a system for incorporating air entrainment into a cementitious paste to form a low density shaped article.

FIG. 3 illustrates an embodiment of the pre-foam system. Water can be inserted through one channel, and water and AEA can be inserted through another channel. Air and water, slurry, or pre-foamed AEA can be inserted where the two pipes meet. The pre-generated foam is developed by a pressure gradient and by a flow velocity difference inside the nozzle while air, AEA and water pass through the nozzle. A foaming agent can be introduced via the pre-generated foaming method via different nozzle-type configurations, for example, 1) air or pre-formed AEA only, 2) air combined with water or any slurry, liquid, or pre-formed AEA, or 3) water with AEA or foaming agent.

In the production of voids, void distribution can greatly affect the physical properties of the cementitious products. In some embodiments, an ideal void size is less than about 200 μm and distributed evenly across the material. In some embodiments, a void size of about 100 μm, about 120 μm, about 140 μm, about 160 μm, about 180 μm, etc. can be used. By using the right type of foaming agent concentration and location, a smaller void size and more homogenously distributed voids can be achieved as compared to voids generated by just injecting air. Overly large void size may generate uneven microstructural distribution which not only may form connected voids inside composite (less water resistance), but also may cause stress concentration and easy fracture initiation. Overly small void size may not give enough density reduction and also cause extra cost and difficulties to generate and control the smaller void size.

Figure 4A:
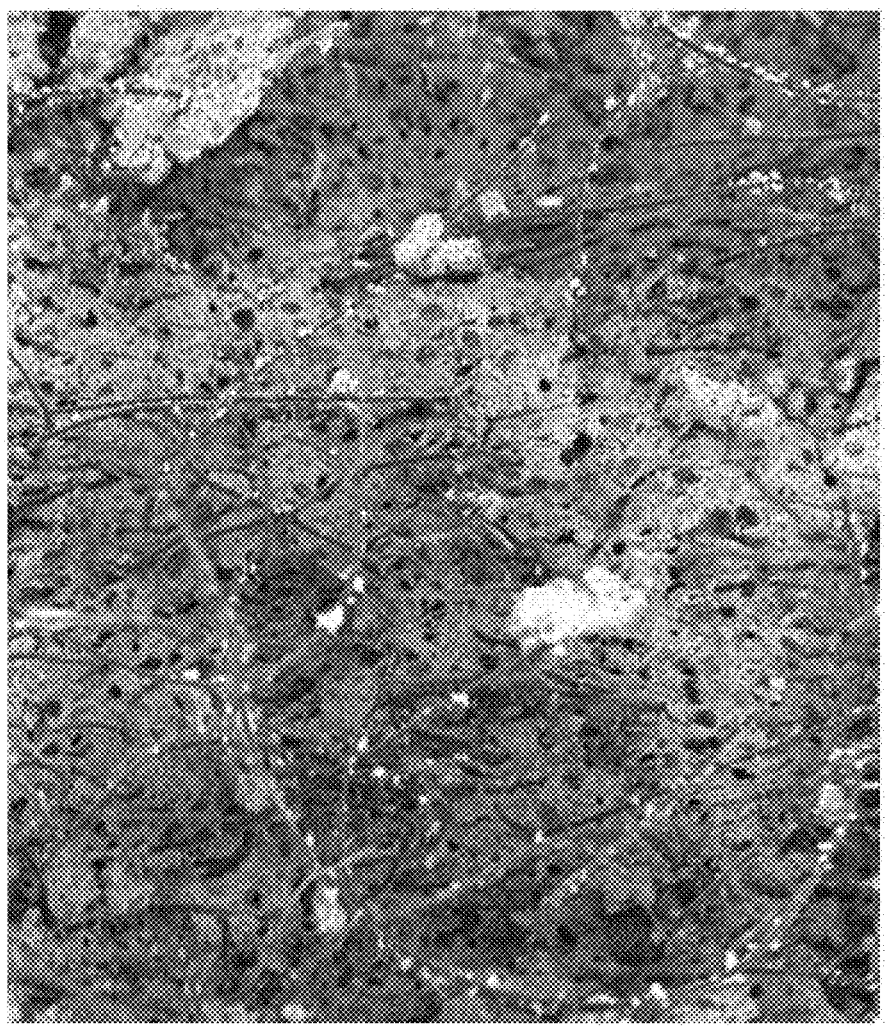
FIGS. 4A-P are SEM photos of low density cementitious articles illustrating foam density and void distribution.
Figure 4B:
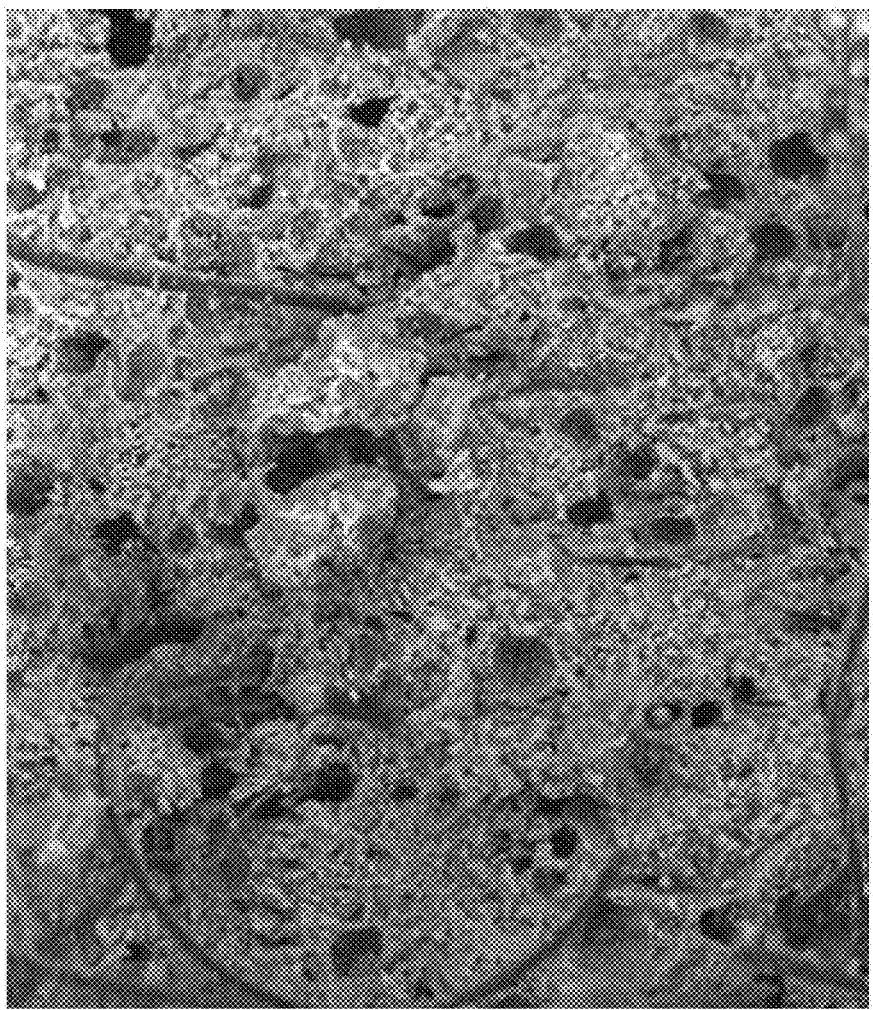
Figure 4C:
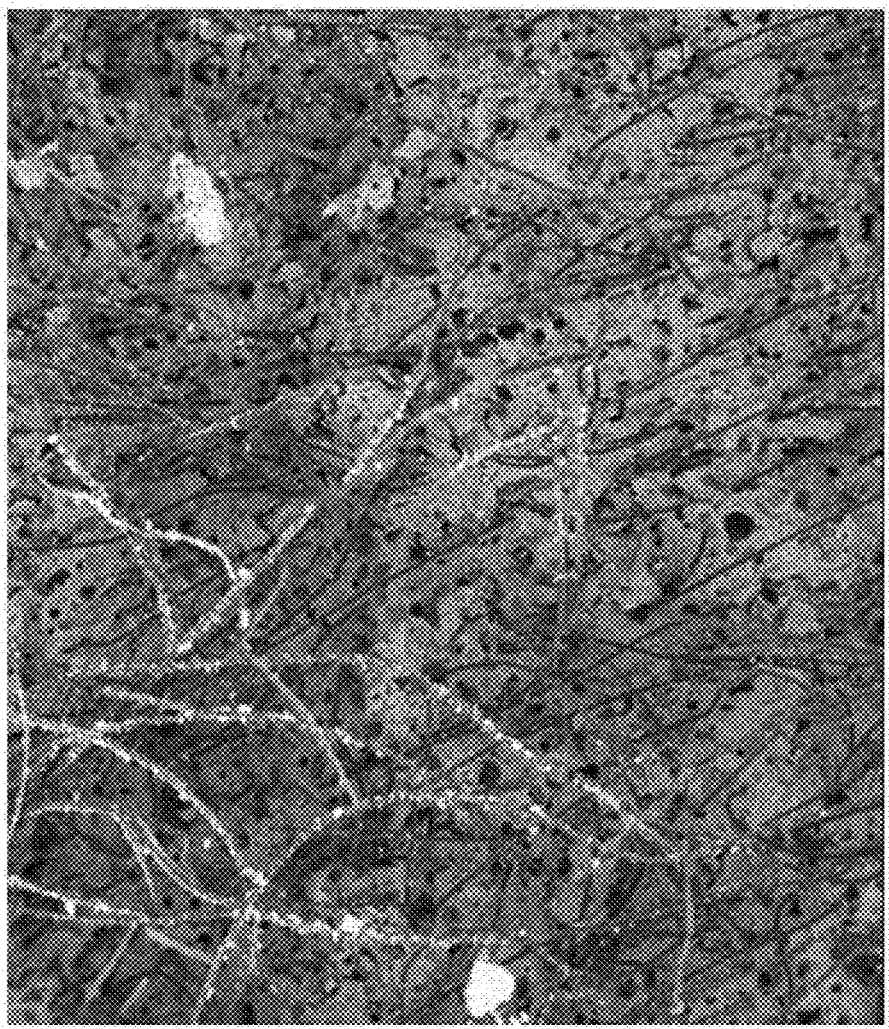
Figure 4D:
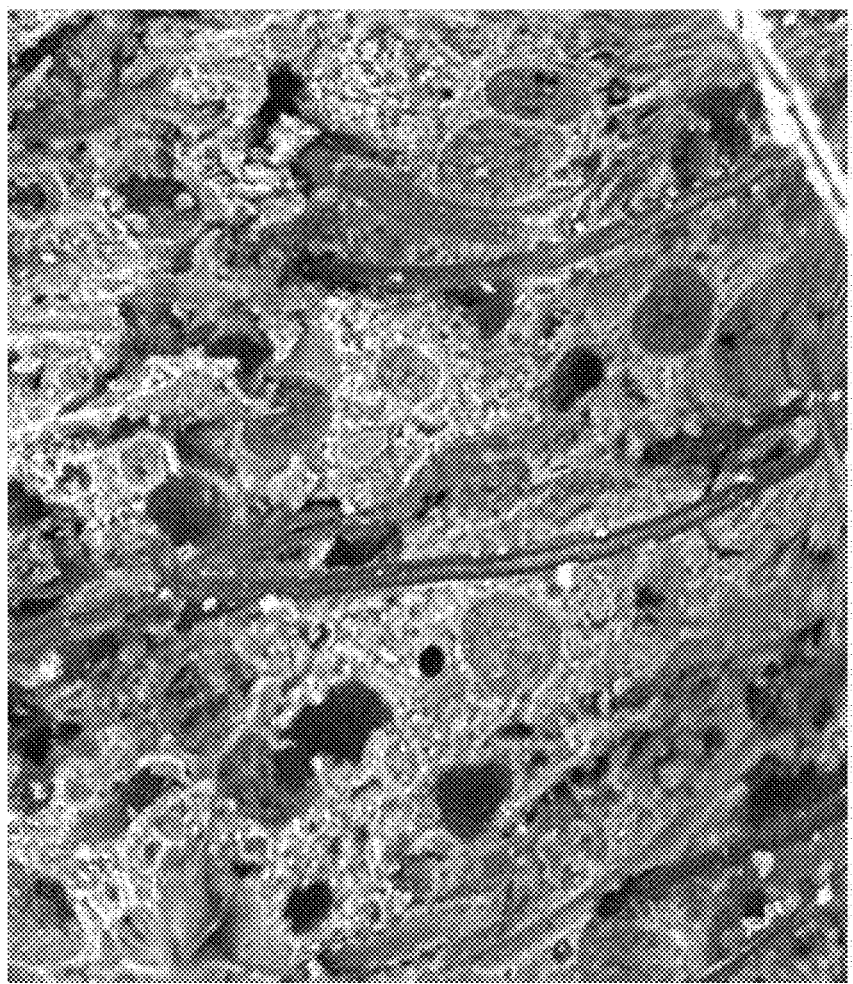
Figure 4E:
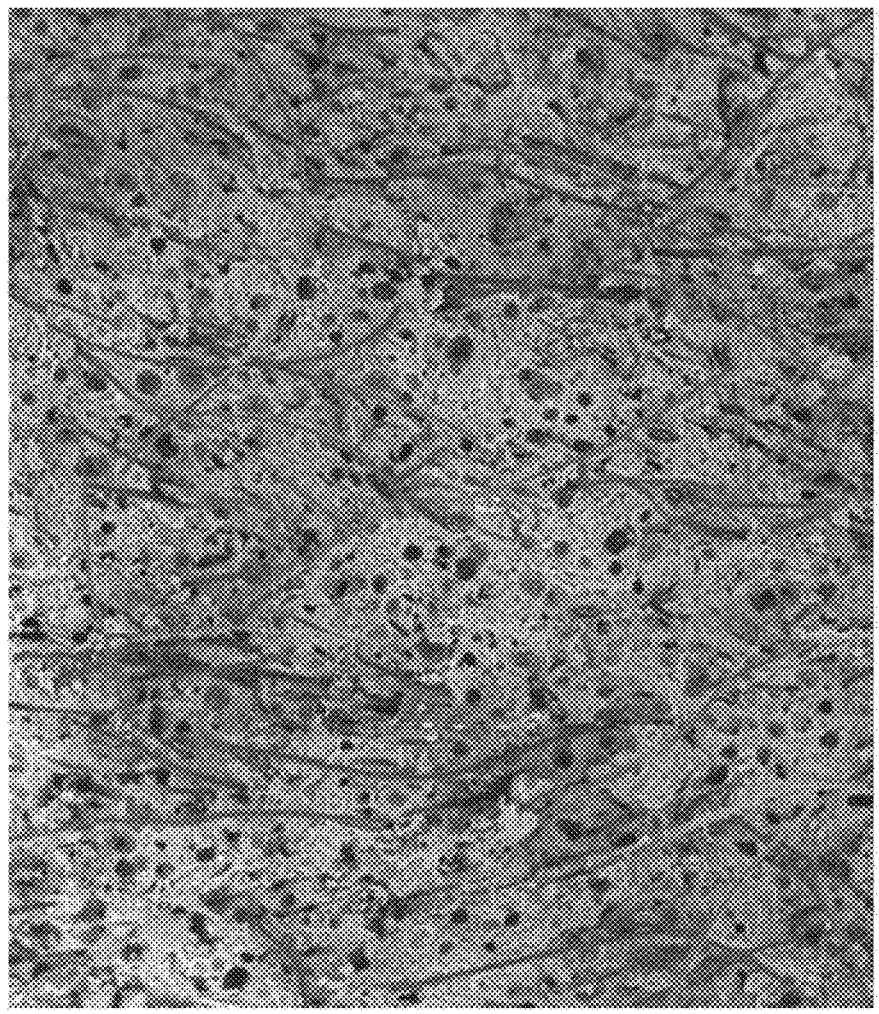
Figure 4F:
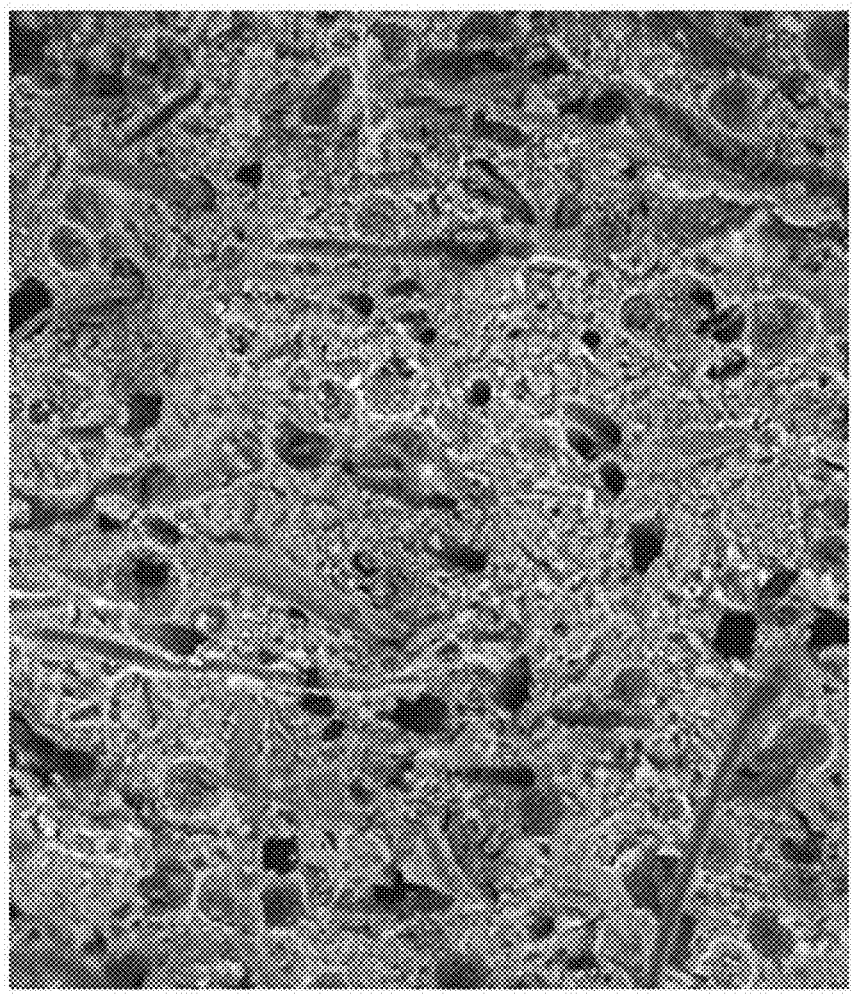
Figure 4G:
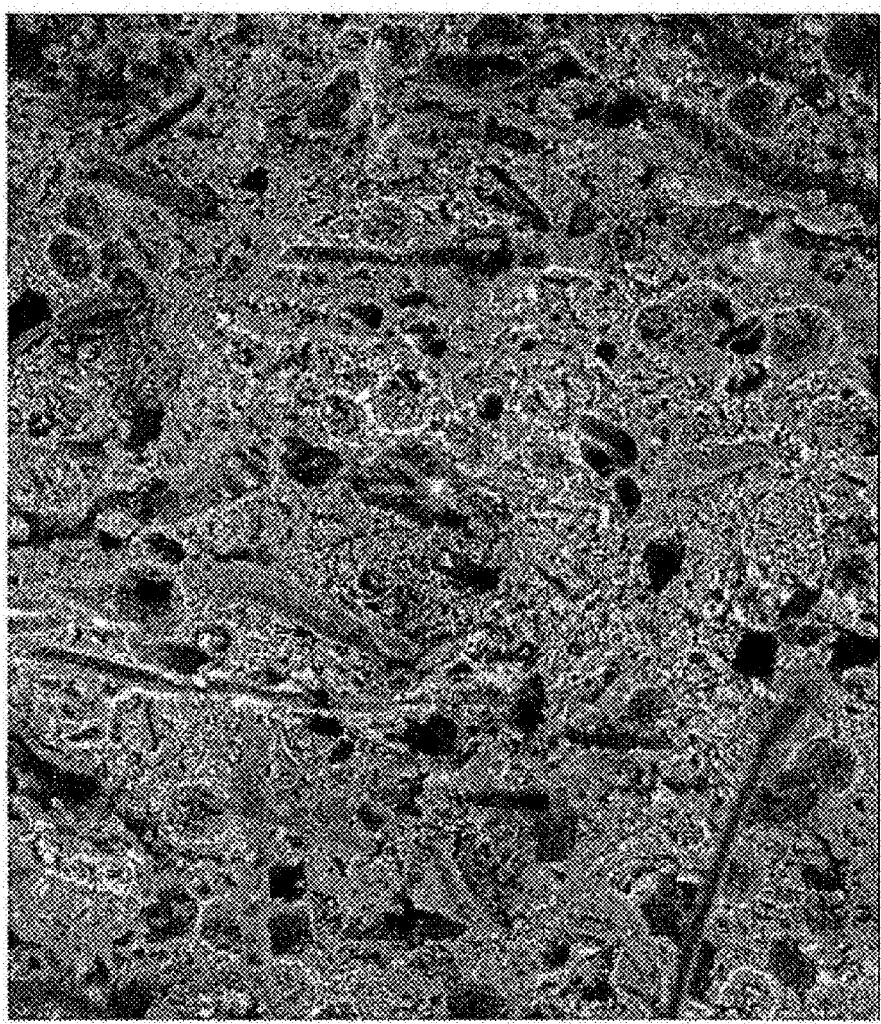
Figure 4H:
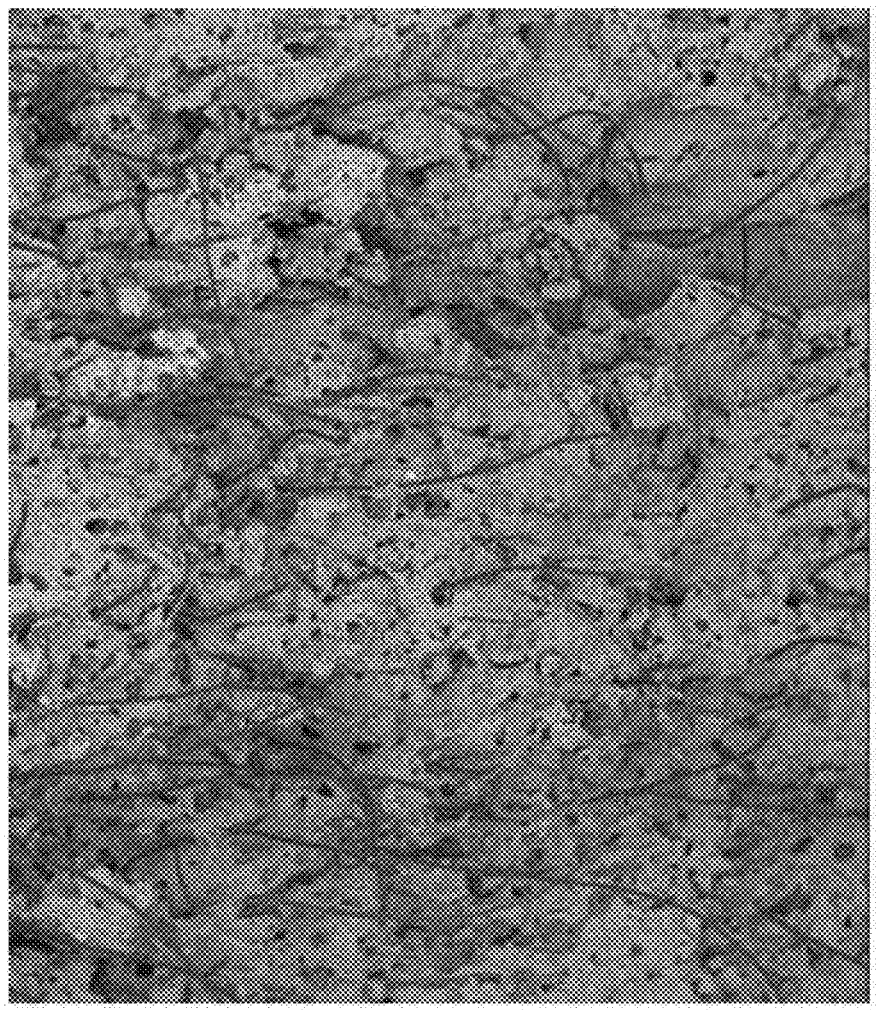
Figure 4I:
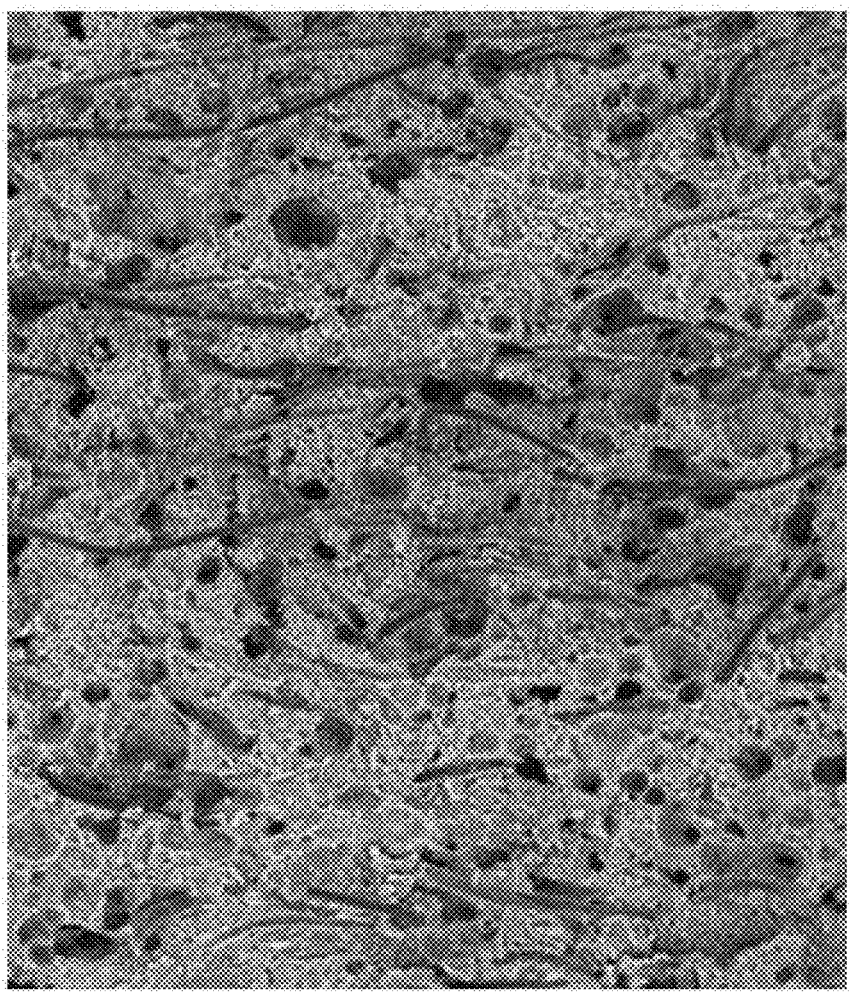
Figure 4J:
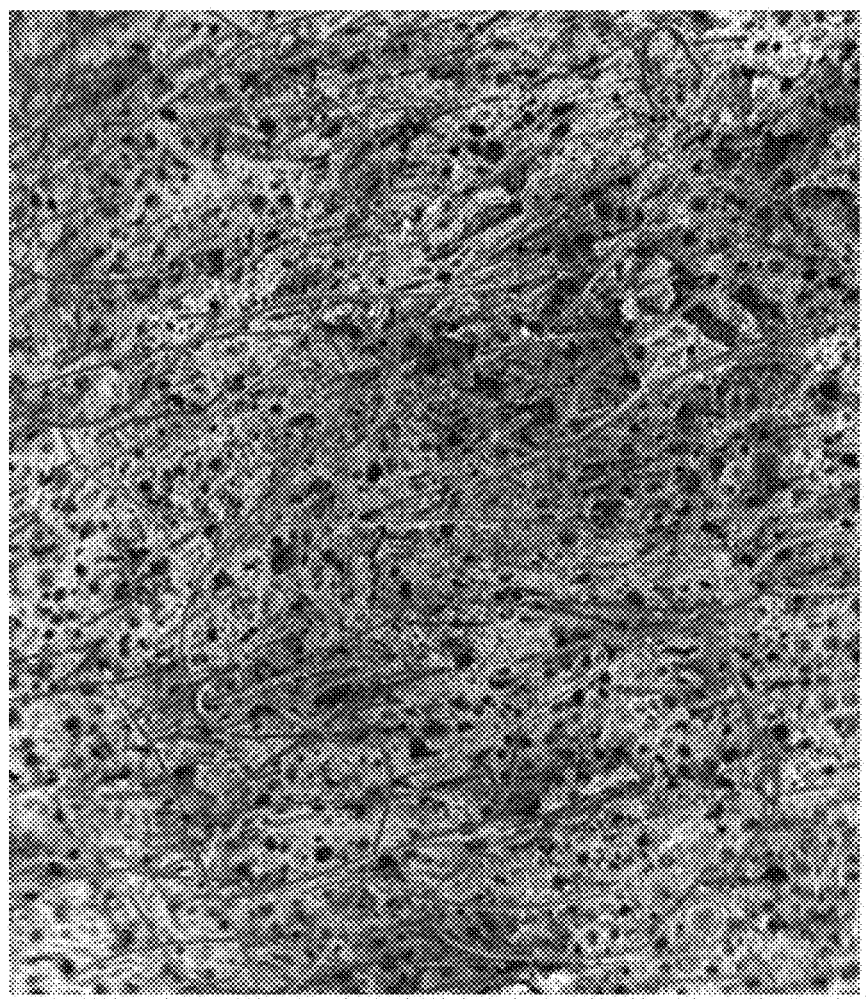
Figure 4K:
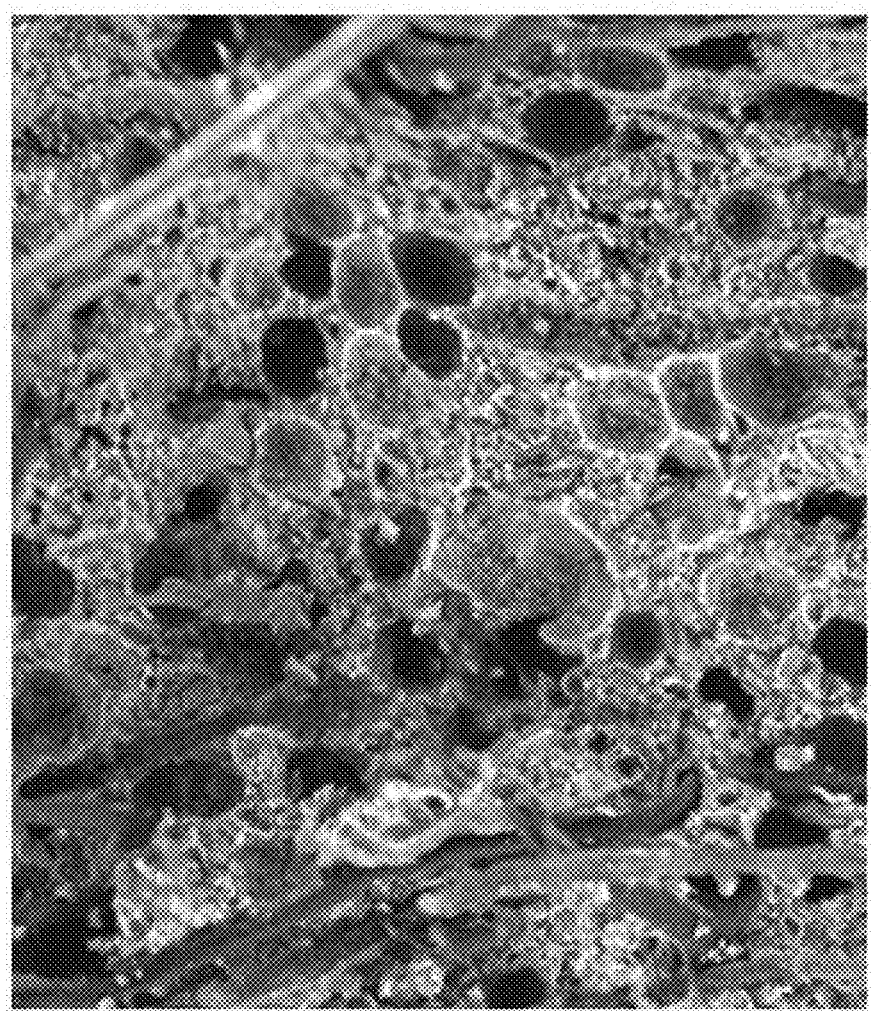
Figure 4L:
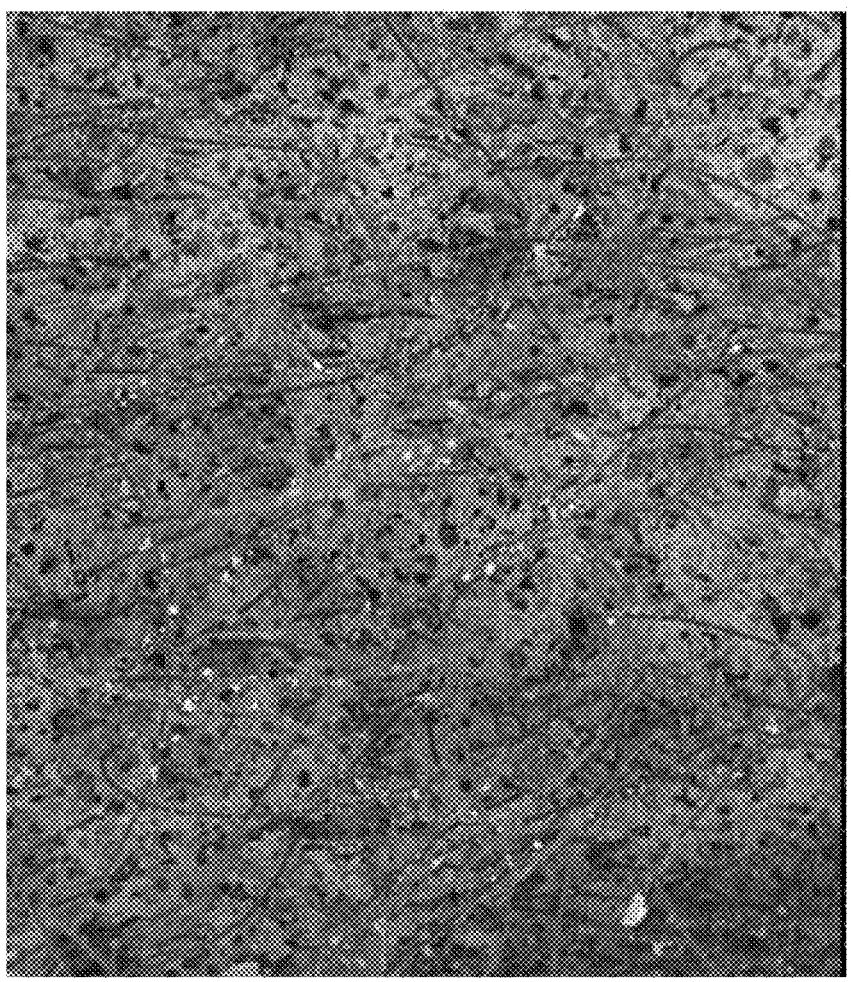
Figure 4M:
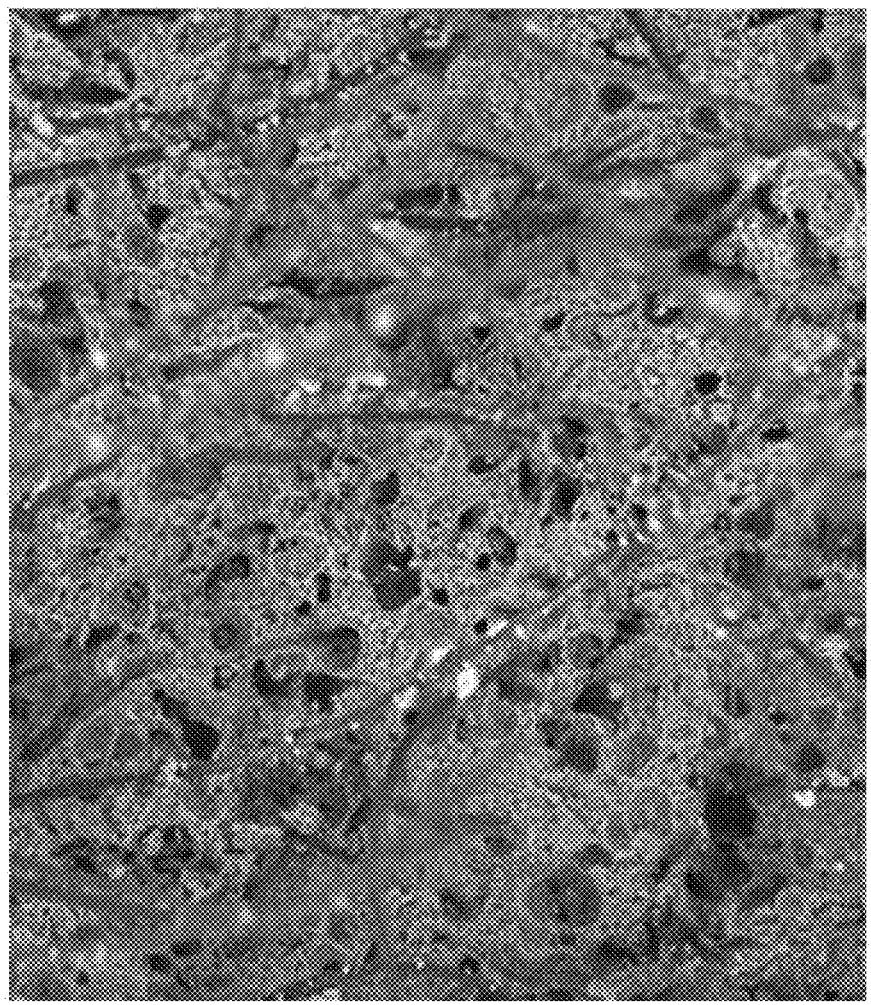
Figure 4N:
Figure 40:
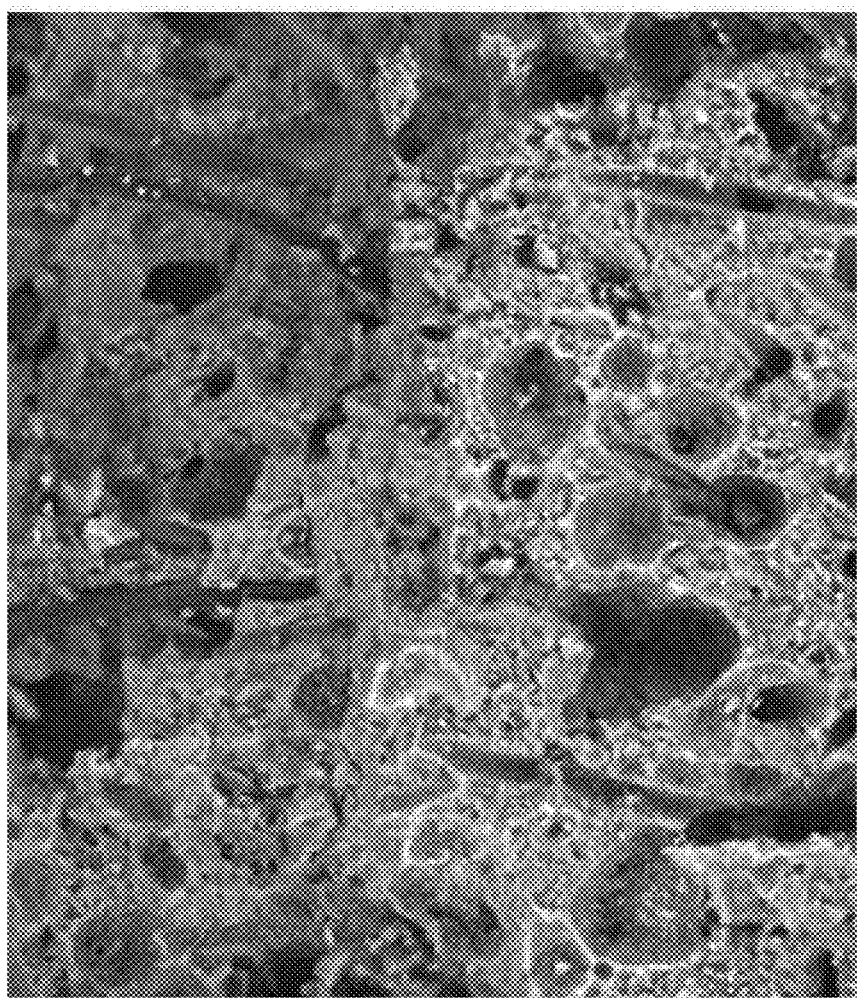
Figure 4P:
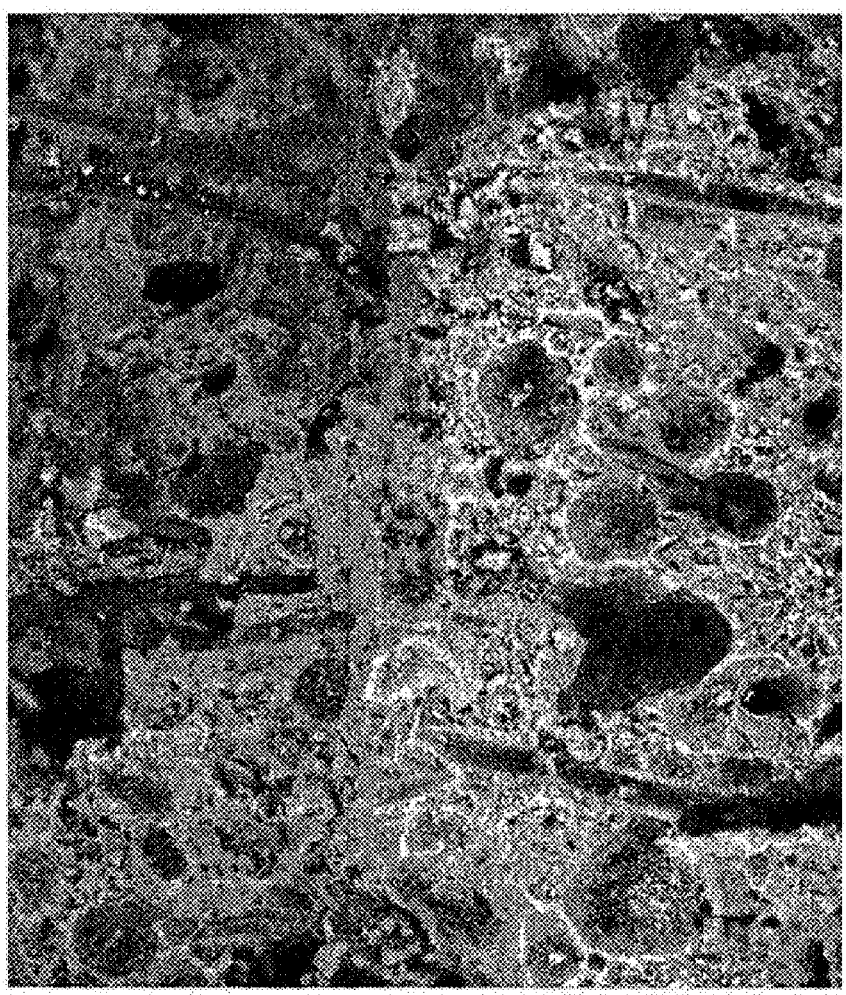

FIGS. 4A-P illustrate SEM photographs of different embodiments of fiber cement manufactured. FIGS. 4A-B illustrate the density and void distribution inside of a control sample formed without AEA. As shown, the density is approximately 1.02 g/cm$^3$. The voids are randomly distributed throughout the cement, and the voids vary from approximately 0.02 to 0.15 mm. FIGS. 4C-D illustrate the density and void distribution inside of an embodiment of fiber cement. As shown, the density is approximately 0.97 g/cm$^3$. The voids are randomly and evenly distributed throughout the cement, and the voids vary from approximately 0.02 to 0.15 mm. FIGS. 4E-G illustrate the density and void distribution inside of an embodiment of fiber cement using a first AEA. As shown, the density is approximately 0.97 g/cm$^3$. The voids are randomly and evenly distributed throughout the cement, and the voids vary from approximately 0.02 to 0.15 mm.

FIGS. 4H-I illustrate the density and void distribution inside of fiber cement using air injection. As shown, the density is approximately 0.95 g/cm$^3$. The voids are randomly, but not evenly, distributed throughout the cement, and the voids vary from approximately 0.02 to 2 mm. FIGS. 4J-K illustrate the density and void distribution inside of an embodiment of fiber cement using a second AEA. As shown, the density is approximately 0.95 g/cm$^3$. The voids are randomly and evenly distributed throughout the cement, and the voids vary from approximately 0.02 to 2 mm. As shown, while the density is similar between the air injection and the second AEA, the second AEA achieves a more even distribution of voids throughout the cement.

FIGS. 4L-M illustrate the density and void distribution inside of a fiber cement material of one embodiment. As shown, the density is approximately 0.94 g/cm$^3$. The voids are randomly and evenly distributed throughout the cement, and the voids vary from approximately 0.02 to 0.2 mm.

FIGS. 4N-P illustrate the density and void distribution inside of an embodiment of fiber cement using the second AEA. As shown, the density is approximately 0.92 g/cm$^3$. The voids are randomly and evenly distributed throughout the cement, and the voids vary from approximately 0.02 to 0.2 mm.

Figure 5A:
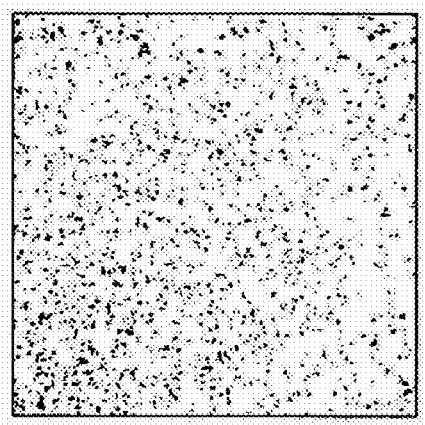
FIGS. 5A-F are images of void distributions of various densities of low density cementitious articles.
Figure 5B:
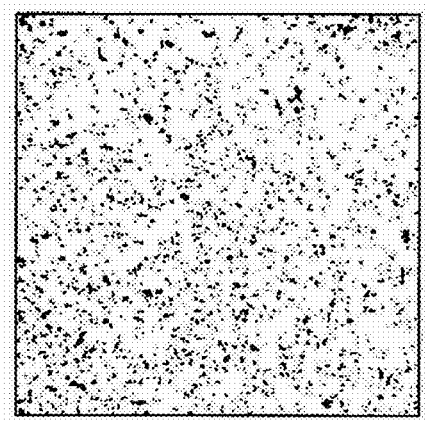
Figure 5C:
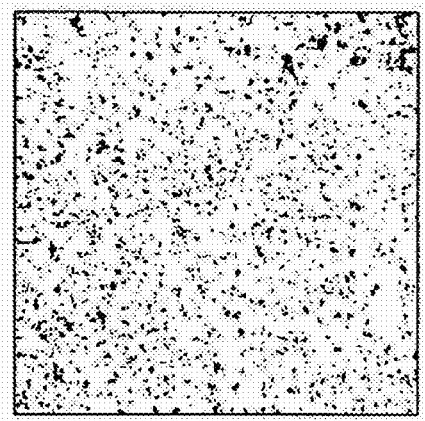
Figure 5D:
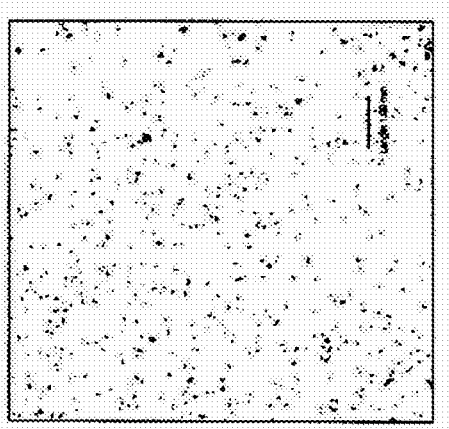
Figure 5E:
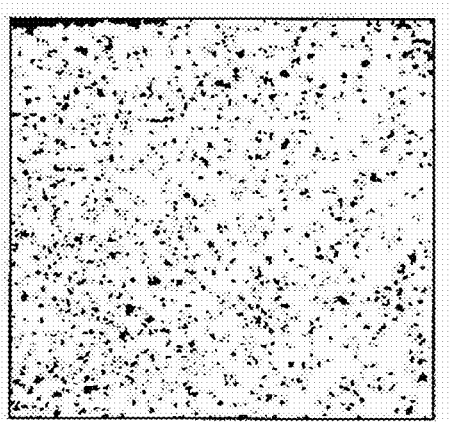
Figure 5F:
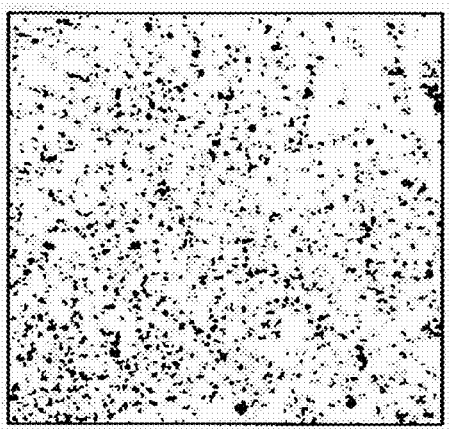

FIGS. 5A-F illustrate a number of potential void distributions of fiber cement articles made according to certain preferred embodiments. FIG. 5A illustrates a density of about 0.99 g/cm$^3$, FIG. 5B illustrates a density of about 0.96 g/cm$^3$, and FIG. 5C illustrates a density of about 0.92 g/cm$^3$, all using a similar solution. FIG. 5D illustrates the void distribution of the control test, having a density of about 1.02 g/cm$^3$, FIG. 5E illustrates the density of the in solution method having a density of about 0.94 g/cm$^3$, and FIG. 5F illustrates the density of the pre-foamed method having a density of about 0.92 g/cm$^3$.

Formation of Articles

In some embodiments, forming shaped articles as described herein can be done with a formulation that comprises a hydraulic cementitious binder, one or more fiber sources, one or more siliceous sources with or without a thermoplastic agent, and various additives. The hydraulic binder may be a single material or a composite, such as cement. Examples of binders include but are not limited to Portland cement, high alumina cement, gypsum, lime, ground furnace slag and the like as well as combinations thereof. In some embodiments, the hydraulic binder generally represents about 20 wt. % to about 80 wt. % of the formulation. In some embodiments, the hydraulic binder is greater than about 30% by weight of the formulation. In some embodiments, the hydraulic binder is less than about 70 wt. %. The binder may include one or more materials that add color to the formulation and thereby to the formed article. In some embodiments, the formulation may include a tint or a material that offers a tint or that alters the color to the formulation when mixed and thereby colors or alters the color of the formed article.

In some embodiments, fibers used in formulations described herein may include a plant or wood based fiber, such as cellulose fiber, which may be bleached or unbleached. Selected plant or wood based fibers are generally hollow, light weight, multi-dimensional and provide excellent strength reinforcement when in the matrix of the formed articles. Fiber dimensions may be pre-selected to achieve a specific nailability, density and toughness of the product. The fiber may be about 0.05 mm to about 12 mm in length. In some embodiments, the fiber length is about 1, 2, 3, 4, 5, 6, 7, 8, 9, 10, or 11 mm. The fiber length in some embodiments is greater than about 1 mm. The fiber diameter is generally between about 5 µm and 150 µm. In some embodiments, a fiber used herein may be initially treated with one or more biocide agents to retard growth of fungi, bacteria, algae or lichen on or near the surface of the fiber or the adjacent cementitious matrix. In some embodiments, a fiber used herein may also be initially treated with one or more water repelling agents to reduce water damage, thereby limiting water ingress into the cementitious matrix. The biocide and/or water repellent agent may also be added to the formulation (e.g., to the admixture).

In some embodiments, fibers for formulations described herein may comprise a high melting point polymer-based synthetic fiber. Examples of high melting point polymeric fiber are polypropylene, polyvinyl alcohol, aramid and the like. A polymeric fiber often has a higher viscoelastic performance than a wood based fiber, and therefore may provide a high flexibility and good performance characteristics to the fiber cement article when formed. An autoclave temperature higher than the fiber melting temperature may be used for formulations described herein without impacting the integrity of the fiber when in a finished article. For example, although the melting point of one polypropylene fiber is about 160° C., an autoclave temperature higher than the melting point temperature, including a temperature of about 170° C. or about 175° C. or about 180° C. may be used without an apparent effect on fiber reinforcement. The fiber may further comprise an inorganic fiber, such as carbon fiber, an alkali resistant glass fiber and the like. An inorganic fiber may be in the form of a mesh, mat, or a continuous configuration. Fibers can be added from about 0% to about 10%, more preferably 0.5% to about 2%. Additionally, in some embodiments plant or wood based fiber can be mixed with synthetic fibers to form a blend.

In formulations described herein, a siliceous source may include one or more aggregates, such as ground silica, silica fume, fly ash, slag, clay, as examples. The siliceous source in the formulation is generally about 10 wt. % to about 70 wt. %. In some embodiments, the siliceous source is greater than about 20 wt. %. In other embodiments, it is greater than about 30 wt. %. In further embodiments, the siliceous source is less than about 60 wt. %. The siliceous source may be about or less than 50 wt. %. The siliceous source may be ground to improve strength of the matrix, which may also affect hardening and/or curing of the article. The surface area of ground particles may be less than about 500 m$^2$/kg or may be less than about 450 m$^2$/kg. In some embodiments, particles may be less than about 400 m$^2$/kg. In some embodiments, particles may be less than about 380 m$^2$/kg. In some embodiments, the aggregates can be further refined to a smaller size with a large surface area. In other embodiments, the aggregates may remain larger while having a smaller surface area, known as "chunk" aggregates.

In some embodiments, one or more cement accelerants may also be included in formulations described herein. The accelerant may be selected from one or more of a calcium silicate hydrate, calcium nitrate, calcium chloride, sodium nitrate, hexamethylenetetramine, recycled powder of a fiber cement product or the like. The accelerant may have a fast setting function, which can allow an article when formed as a green fiber cement article to set and harden quickly. This also can allow a green article to be handled after processing without damage to the green article. In some embodiments, the accelerant may also be a fast curing agent. Rapid curing reduces the process time, thus reducing cost and allowing formed products to be manufactured and used more quickly. An accelerant may be selected to change the chemical phase formed in the cured product, thus contributing to an altered and/or desired performance of the end product. This may be incorporated from about 0% by wt. to about 30% by wt., more preferably about 15% to about 22% by wt.

In some embodiments, formulations described herein may further comprise one or more viscosity or process enhancing agents. The viscosity enhancing agent (VEA) may be selected from one or more of a plasticizer, super plasticizer, an emulsifier or thickener, such as methylcellulose, hydroxyl-ethyl cellulose, a cellulose ether or other suitable compound. The viscosity or process enhancing agent aids in the mixing and forming processes during manufacturing. This may be incorporated from about 0.5% by wt. to about 2% by wt., more preferably 0.6% to about 1% by wt.

Still further, in some embodiments a formulation described herein may comprise one or more foaming agents, air entrapping agent or blowing agents, and/or bubble stabilizers. A compound or chemical that helps to introduce gas pockets into the matrix of an article during manufacturing may be considered to be a foaming agent or a blowing agent. Examples include a gas or a material that produces a gas, such as calcium carbonate hydrate, sodium bicarbonate, aluminum powder, as representative examples. Such materials are generally activated by heat or moisture and release gas such as carbon dioxide or hydrogen into the matrix thus introducing and forming one or more gas pockets or voids described previously. In some embodiments, voids may be further or in an alternative incorporated into the article by mechanical air entrainment, such as through rigorous mixing in the presence of air, or a gas, with or without an air entraining agent. For the various types of potential AEA's they can be added in the amount of from about 0.001% to about 0.10%, more preferably about 0.003% to about 0.050%.

Pulp Dispersion

In some embodiments, a major problem in the formation of cementitious boards is that pulp from the formation process can be distributed unevenly throughout a cementitious board. Uneven pulp distribution can lead to uneven physical characteristics of the boards. Therefore, a board may be weaker in some areas than others, which could lead to breakage during normal use, and especially during harsh conditions. Surprisingly, the increase in voids within the cementitious board does not negatively impact the dispersion of pulp throughout the board. In fact, in some instances the pulp dispersion was better in boards manufactured with AEA as compared to boards manufactured without AEA.

EXAMPLES

The formulations described thus far are on a dry mass basis. Water can be further added into the formulation in a quantity less than about 75% the weight of the formulation on a dry mass basis. In some embodiments, the water content is less than about 50%, less than about 40%, less than about 30% of the formulation (based on the dry weight). One example of such a formulation can be seen in Tables 1A-B below. Table 1A illustrates an example formulation of a cementitious product that can be formed in one embodiment of the disclosure. Table 1B illustrates a general formulation range that can be formed in an embodiment of the disclosure.

TABLE 1A

Example Formulation

|  | In Solution | PreFoamed |
|---|---|---|
| Cement | 45% | 45% |
| Fiber |  |  |
| Cellulose | 4% | 4% |
| Synthetic | 1.40% | 1.40% |
| AEA | 0.05% | 0.01% |
| Aggregate |  |  |
| "Chunks" | 20% | 20% |
| Refined | 29% | 29% |
| VEA | 0.85% | 0.85% |

TABLE 1B

Overall Formulation Range

|  | In Solution | PreFoamed |
|---|---|---|
| Cement | 35-70% | 35-70% |
| Fiber |  |  |
| Cellulose | 0-10% | 0-10% |
| Synthetic | 0-5% | 0-5% |
| AEA | 0-0.1% | 0-0.1% |
| Aggregate |  |  |
| "Chunks" | 0-30% | 0-30% |
| Refined | 10-40% | 10-40% |
| VEA | 0.6-1% | 0.6-1% |

Product performance properties are an important factor when modifying a composite formulation. This formulation modification can provide a lighter weight product that shows performance that is at parity or better than a formulation without an AEA. Tables 2A-B, below, illustrate mechanical properties, such as oven dried (OD) density, measured for embodiments of the disclosure. In testing of both types of incorporation methods of the AEA into the paste, it is shown that a reduced density can be achieved. Density can be as low as about 0.75 g/cm$^3$ with the proper AEA and insertion method.

TABLE 2A

Example Physical Property Measures

|  | Control | In Solution | PreFoamed |
|---|---|---|---|
| OD Density (g/cm$^3$) | 1 | 0.93 | 0.93 |
| MOR (MPa) | 6.5 | 6.5 | 6.5 |
| Energy B (KJ/m$^3$) | 1.75 | 2.25 | 2.25 |

TABLE 2B

Overall Physical Property Range

|  | Control | In Solution | PreFoamed |
|---|---|---|---|
| OD Density (g/cm$^3$) | 0.98-1.04 | 0.85-0.95 | 0.75-0.95 |
| MOR (MPa) | 5-8 | 5-8 | 5-8 |
| Energy B (KJ/m$^3$) | 1.75 | 2-5 | 2-5 |

Tables 2A-B show the mechanical results of forming a cementitious board using a control test without foaming, foaming in solution, and pre-foamed methods. The in solution and pre-foamed methods both use AEA. The overall density is generally lower for the AEA methods as compared to the control. Comparing the AEA methods, the pre-foamed method can achieve a lower overall density than the in solution method. Surprisingly and significantly, the modulus of rupture (MOR) is the same throughout all of the tests. Moreover, the AEA methods achieve a higher toughness than the control test.

It is also shown through standard testing methods, such as ASTM C1186, that the flexural strength can be maintained as current standards require. Installation of the product also remains the same as no predrilling is required. By controlling the void size and distribution, one can obtain a homogenous and improved microstructure which in turn provides better handleability of the product. Surprisingly, all of these resultant characteristics provide a fiber cement based product that has similar flexural and strength properties as materials, such as some wood and PVC composites, but has the advantages of being rot and insect resistant as well not fading or changing color due to UV exposure, with additional advantages of dimensional stability and cheaper compared to PVC. By controlling the void size and the amount of voids, the microstructure of the board can be improved, thereby improving handleability.

Figure 6:
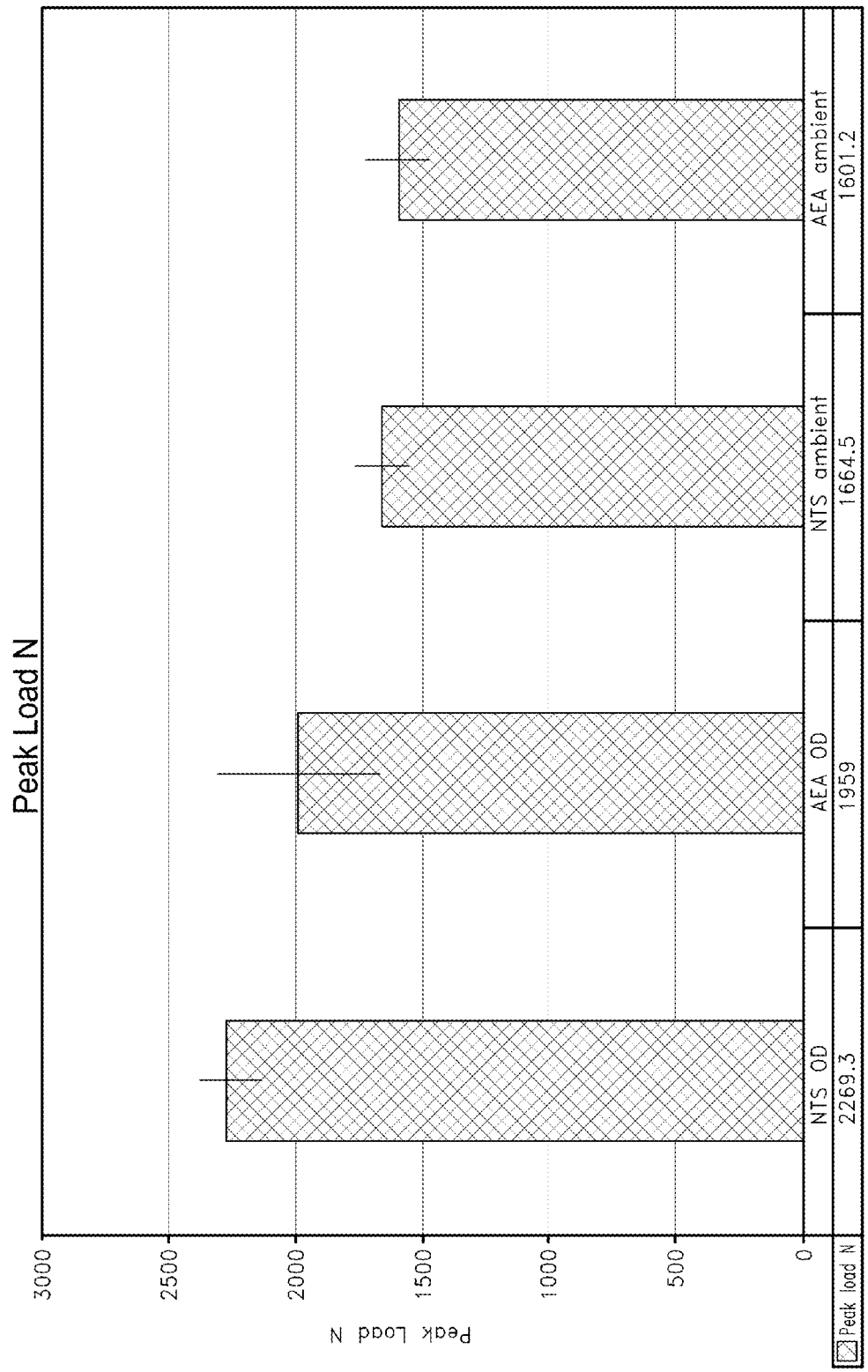
FIG. 6 illustrates a peak load comparison test on fiber cement articles formed without AEA and fiber cement articles formed according to embodiments of the disclosure.

FIG. 6 illustrates another test that was preformed regarding concealed nailing. As shown, the embodiments of boards manufactured using AEA can withstand approximately the same load conditions as boards made without AEA. The boards can receive a peak load of approximately 2000 N in testing conditions, and approximately 1700 N in ambient conditions.

Lower density cementitious shaped articles also provides for other advantages. For example, the lower density shaped articles require less material, and therefore also can reduce the raw cost of the shaped articles. Additionally, the lower density boards allow for faster sanding, which can reduce overall finishing delay. Further, lower density allows for better and faster cooking of the article.

The foregoing description of the preferred embodiment of the present disclosure has shown, described and pointed out the fundamental novel features of the disclosure. It will be understood that various omissions, substitutions, and changes in the form of the detail of the apparatus as illustrated as well as the uses thereof, may be made by those skilled in the art, without departing from the spirit of the disclosure.

What is claimed is:

1. A low density cementitious article comprising:
a monolithic cementitious matrix comprising a plurality of closed cell voids, wherein the size and shape of the closed cell voids are defined by the cementitious matrix; said closed cell voids are distributed throughout the matrix in a manner such that the density of the cementitious matrix remains uniform throughout the article, wherein the cementitious matrix has a density of greater than or equal to at least 0.5 g/cm$^3$ and less than 1 g/cm$^3$, wherein the composition of the cementitious matrix comprises 35-70% cement; 0-15% reinforcing fibers; 0-0.1% air entrainment agents; 10-70% siliceous aggregates; and 0.6-1% viscosity enhancement agents, wherein said closed cell voids are distributed so that there are between 25 and 2000 voids per cm$^3$.

2. The low density cementitious article of claim 1, wherein the density of the cementitious matrix is less than 0.97 g/cm$^3$.

3. The low density cementitious article of claim 1, wherein the density of the cementitious matrix is between 0.92 g/cm$^3$ and 0.97 g/cm$^3$.

4. The low density cementitious article of claim 1 further comprising open cell voids, wherein the open cell voids are less than 10% of the combined total of the open cell voids and closed cell voids.

5. The low density cementitious article of claim 1, wherein the closed cell voids are 0.02 to 0.15 mm in diameter.

6. The low density cementitious article of claim 1, wherein the cementitious matrix has a thickness of less than 20 millimeters (mm).

7. The low density cementitious article of claim 1 further comprising reinforcing fibers, wherein the reinforcing fibers comprise a blend of cellulose fibers and polypropylene fibers.

8. The low density cementitious article of claim 1, wherein the article has a modulus of rupture of between 5 and 8 MPa and toughness of between 2 and 5 KJ/m$^3$.

9. The low density cementitious article of claim 1 comprising an elongate rectangular configuration.

10. The low density cementitious article of claim 9, wherein the cementitious article is a siding board.

11. The low density cementitious article of claim 1, wherein the composition of the cementitious matrix comprises at least 0.001% air entrainment agents.

12. The low density cementitious article of claim 1, wherein the composition of the cementitious matrix comprises 0.003-0.05% air entrainment agents.

* * * * *